(12) United States Patent
Zheng

(10) Patent No.: US 6,869,079 B2
(45) Date of Patent: Mar. 22, 2005

(54) STACKABLE METALLIC SEAL AND METHOD OF USING SAME

(75) Inventor: Qiu Shi Zheng, Spring, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 10/347,643

(22) Filed: Jan. 21, 2003

(65) Prior Publication Data
US 2003/0155717 A1 Aug. 21, 2003

Related U.S. Application Data

(60) Provisional application No. 60/357,405, filed on Feb. 15, 2002.

(51) Int. Cl.$^7$ .................................. F16J 15/26
(52) U.S. Cl. .................. 277/511; 277/530; 277/541; 277/342
(58) Field of Search .................. 277/342, 511, 277/530, 531, 541; 166/120, 121

(56) References Cited

U.S. PATENT DOCUMENTS

| 954,195 A | | 4/1910 | Law | |
|---|---|---|---|---|
| 1,771,890 A | | 7/1930 | Hubbard et al. | |
| 2,903,281 A | * | 9/1959 | Avery | 277/530 |
| 3,098,660 A | * | 7/1963 | Hausner | 277/530 |
| 3,378,269 A | * | 4/1968 | Castor | 277/336 |
| 3,833,228 A | * | 9/1974 | Gilliam, Sr. | 277/530 |
| 3,915,462 A | * | 10/1975 | Bruns et al. | 277/647 |
| 4,053,163 A | * | 10/1977 | Vegella | 277/530 |
| 4,131,287 A | | 12/1978 | Gunderson et al. | |
| 4,160,551 A | * | 7/1979 | Nixon et al. | 277/558 |
| 4,288,082 A | | 9/1981 | Setterberg, Jr. | |
| 4,512,586 A | * | 4/1985 | Smith | 277/308 |
| 4,576,385 A | | 3/1986 | Ungchusri et al. | |
| 4,588,030 A | | 5/1986 | Blizzard | |
| 4,592,558 A | * | 6/1986 | Hopkins | 277/572 |
| 5,180,450 A | * | 1/1993 | Rao | 148/579 |
| 5,246,236 A | * | 9/1993 | Szarka et al. | 277/337 |
| 5,327,964 A | * | 7/1994 | O'Donnell et al. | 166/208 |
| 5,478,048 A | * | 12/1995 | Salesky et al. | 251/214 |
| 5,577,737 A | * | 11/1996 | Lacy | 277/308 |
| 5,615,896 A | * | 4/1997 | Morvant | 277/530 |
| 6,302,402 B1 | * | 10/2001 | Rynders et al. | 277/530 |
| 6,561,517 B2 | * | 5/2003 | James | 277/511 |

OTHER PUBLICATIONS

PCT/US03/03908 International Search Report dated Jun. 18, 2003.

* cited by examiner

*Primary Examiner*—Alison K. Pickard
(74) *Attorney, Agent, or Firm*—Williams, Morgan & Amerson, P.C.

(57) ABSTRACT

A seal for sealing between a first component and a second component includes a first metallic element comprising a plurality of sealing profiles and defining a groove therein and a second metallic element comprising a plurality of sealing profiles and a protrusion mated with the groove of the first metallic element. The seal further includes a retaining member engaged with the second metallic element and capable of being engaged with one of the first component and the second component for retaining the first and second metallic elements in a position, wherein some of the plurality of sealing profiles are capable of sealing against the first component and some of the plurality of sealing profiles are capable of sealing against the second component.

30 Claims, 3 Drawing Sheets

STACKABLE METALLIC SEAL AND METHOD OF USING SAME

CROSS REFERENCE TO RELATED APPLICATIONS

This application claims the benefit of U.S. Provisional Application No. 60/357,405, filed Feb. 15, 2002.

BACKGROUND OF THE INVENTION

1. Field of the Invention

This invention relates to metallic seals and, in particular, to a stackable metallic seal and a method of using same.

2. Description of the Related Art

In many industries, such as the oil and gas industry, it is often necessary to provide reliable fluid seals in extremely hostile environments. For example, the flow control equipment associated with oil and gas wells (e.g., Christmas trees, valves, connectors, and the like) are provided with a large number of seals that isolate the produced fluids and control fluids (e.g., hydraulic fluid, methanol, and the like) from the environment. Such seals are often made of nonmetallic, elastomeric materials.

One conventional configuration for elastomeric seals is a U-type or V-type arrangement, wherein a plurality of "U" or "V" cross-sectionally shaped seal elements are stacked in such a way that the sealing lips of one element are energized by the axial force exerted by the adjacent element. Several embodiments of this type of seal are shown and described in commonly owned U.S. Pat. No. 4,576,385 to Ungchusri et al., the entirety of which is hereby incorporated by reference for all purposes.

In many wells, however, the produced fluid exits the well at very high temperatures and pressures. Nonmetallic seals may extrude and mechanically degrade under these conditions, ultimately leading to failure of the seal. There is also a risk of fire in oil and gas wells, which can damage or destroy such nonmetallic seals.

One way of addressing these problems is to use metal-to-metal seals, rather than nonmetallic seals, in portions of the equipment that are subject to high pressure and/or high temperature conditions. One type of metal-to-metal seal is known as a straight bore metal seal, which comprises a mechanically-energized sealing lip that seals against a generally smooth, cylindrical surface. Several embodiments of this type of seal are shown and described in commonly-owned U.S. Pat. No. 4,471,965 to Jennings et al., the entirety of which is hereby incorporated by reference for all purposes.

Such straight bore metal seals are generally effective when the surface against which the seal contacts is smooth. However, if the surface is rough, or if the sealing lip is scratched or otherwise damaged, the seal may leak. Furthermore, such straight bore metal seals are generally not stacked in series to increase reliability unless a cartridge or other carrier is provided to contain them. Such a carrier, however, adds additional cost to the seal, may create another potential leak path in the seal, and may necessitate enlarging the packing gland and packing chamber.

The present invention is directed to overcoming, or at least reducing, the effects of one or more of the problems set forth above.

SUMMARY OF THE INVENTION

In one aspect of the present invention, a seal for sealing between a first component and a second component is provided. The seal includes a first metallic element comprising a plurality of sealing profiles and defining a groove therein and a second metallic element comprising a plurality of sealing profiles and a protrusion mated with the groove of the first metallic element. The seal further includes a retaining member engaged with the second metallic element and capable of being engaged with one of the first component and the second component for retaining the first and second metallic elements in a position, wherein some of the plurality of sealing profiles are capable of sealing against the first component and some of the plurality of sealing profiles are capable of sealing against the second component.

In another aspect of the present invention, a seal for sealing between a first component and a second component is provided. The seal includes a center metallic element comprising a plurality of sealing profiles and defining a first groove and a second groove therein and a first metallic element comprising a plurality of sealing profiles and a protrusion mated with the first groove of the center metallic element. The seal further includes a second metallic element comprising a plurality of sealing profiles and a protrusion mated with the second groove of the center metallic element and a retaining member capable of being engaged with one of the first component and the second component for retaining the first metallic element, the center metallic element, and the second metallic element in a position.

In yet another aspect of the present invention, a method of sealing between a first component and a second component is provided. The method includes applying a fluid pressure to a first metallic element, urging a plurality of sealing profiles of the first metallic element against the first component and the second component, and urging the first metallic element against a second metallic element. The method further includes urging a plurality of sealing profiles of the second metallic element against the first component and the second component.

In another aspect of the present invention, a method of sealing between a first component and a second component is provided. The method includes applying a fluid pressure in a first direction to a first metallic element, urging a plurality of sealing profiles of the first metallic element against the first component and the second component to inhibit a flow of fluid therebetween in the first direction, and urging a first set of a plurality of sealing profiles of a second metallic element against the first component and the second component to inhibit a flow of fluid therebetween in the first direction. The method further includes applying a fluid pressure in a second direction that is different from the first direction to a third metallic element, urging a plurality of sealing profiles of the third metallic element against the first component and the second component to inhibit a flow of fluid therebetween in the second direction, and urging a second set of the plurality of sealing profiles of the second metallic element against the first component and the second component to inhibit the flow of fluid therebetween in the second direction.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

Figure 1:
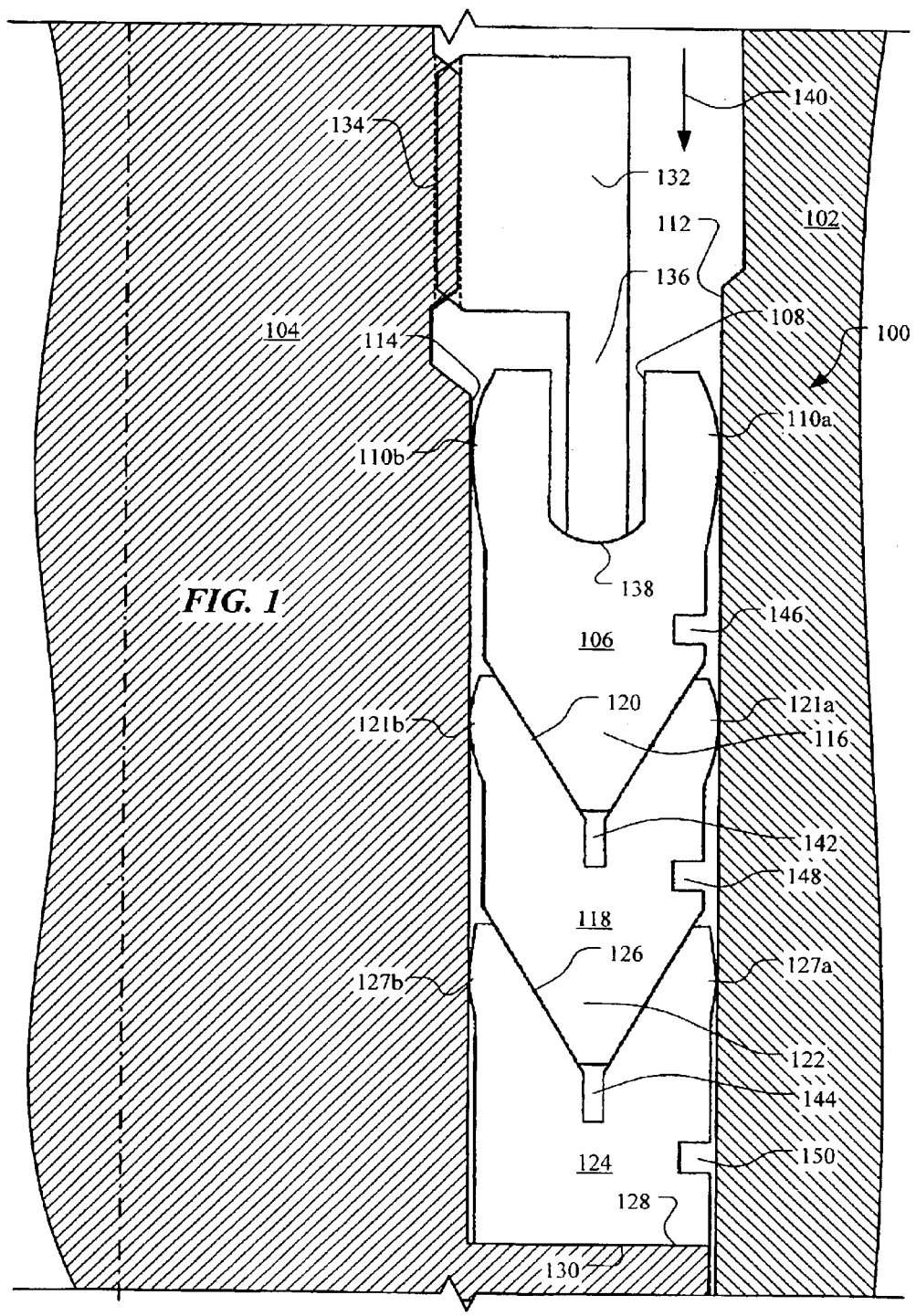
FIG. 1 is cross-sectional side view of a first illustrative embodiment of a seal according to the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

FIG. 1 depicts a first illustrative embodiment of a metallic, annular seal 100 according to the present invention for sealing between a first component 102 and a second component 104. In one embodiment, the first component 102 may be a generally fixed component, such as a bonnet, and the second component 104 may be a rotating and/or translating component, such as a stem of a valve or choke. In the illustrated embodiment, the seal 100 comprises an upper element 106 defining a generally U-shaped groove 108 therein. The upper element 106 further comprises a first sealing profile 110a for sealing against a surface 112 of the first component 102 and a second sealing profile 110b for sealing against a surface 114 of the second component 104. The upper element 106 further includes a protrusion 116 that, in the illustrated embodiment, is generally wedge-shaped in cross-section.

The seal 100 further comprises an intermediate element 118 disposed below the upper element 106. The intermediate element 118 defines a groove 120 that is generally V-shaped in cross-section for mating with the protrusion 116 of the upper element 106. The intermediate element 118 further comprises a first sealing profile 121a for sealing against the surface 112 of the first component 102 and a second sealing profile 121b for sealing against the surface 114 of the second component 104. The intermediate element 118 further includes a protrusion 122 that, in the illustrated embodiment, is generally wedge-shaped in cross-section.

Still referring to FIG. 1, the seal 100 further comprises a lower element 124 disposed below the intermediate element 118. The lower element 124 defines a groove 126 that is generally V-shaped in cross-section for mating with the protrusion 122 of the intermediate element 118. The lower element 124 further comprises a first sealing profile 127a for sealing against the surface 112 of the first component 102 and a second sealing profile 127b for sealing against the surface 114 of the second component 104. The lower element 124 further includes a lower surface 128 for abutting a shoulder 130 of the second component 104.

The seal 100 further includes a retaining element 132 that is threadedly engaged with the second component 104 generally at 134. In the illustrated embodiment, the retaining element 132 comprises a leg 136 that extends into the groove 108 of the upper element 106 and abuts with a bottom surface 138 thereof. The retaining element 132 serves to retain the seal 100 in position with respect to the second component 104 prior to and during installation of the first component 102. Further, the retaining element 132 supports the seal 100 during reverse pressurization.

When a net fluid pressure is applied from above the seal 100 (as indicated by an arrow 140), the sealing profiles 110a, 110b are further urged against the surfaces 112, 114, respectively, to inhibit a flow of fluid therebetween. The fluid pressure further urges the upper element 106 downward toward the intermediate element 118, thus applying pressure to the intermediate element 118. The protrusion 116 of the upper element 106 presses against the groove 120 of the intermediate element 118, which urges the sealing profiles 121a, 121b more firmly against the surfaces 112, 114 to inhibit a flow of fluid therebetween. In one embodiment, the intermediate member 118 further defines a slot 142 extending from the groove 120, which decreases the amount of force required from the upper element 106 to urge the sealing profiles 121a, 121b against the surfaces 112, 114, respectively.

Still referring to FIG. 1, the intermediate element 118 is urged downward as a result of the fluid pressure on the upper element 106, thus applying pressure to the lower element 124. The protrusion 122 of the intermediate element 118 presses against the groove 126 of the lower element 124, which urges the sealing profiles 127a, 127b more firmly against the surfaces 112, 114, respectively, to inhibit a flow of fluid therebetween. In one embodiment, the lower member 124 further defines a slot 144 extending from the groove 126, which decreases the amount of force required from the intermediate element 118 to urge the sealing profiles 127a, 127b against the surfaces 112, 114, respectively. The downward force on the lower element 124 is counteracted by the shoulder 130 of the second component 104.

In the illustrated embodiment, each of the elements 106, 118, 124 further defines a recess 146, 148, 150, respectively, capable of engaging a tool (not shown) for installing and removing the seal 100.

Figure 2:
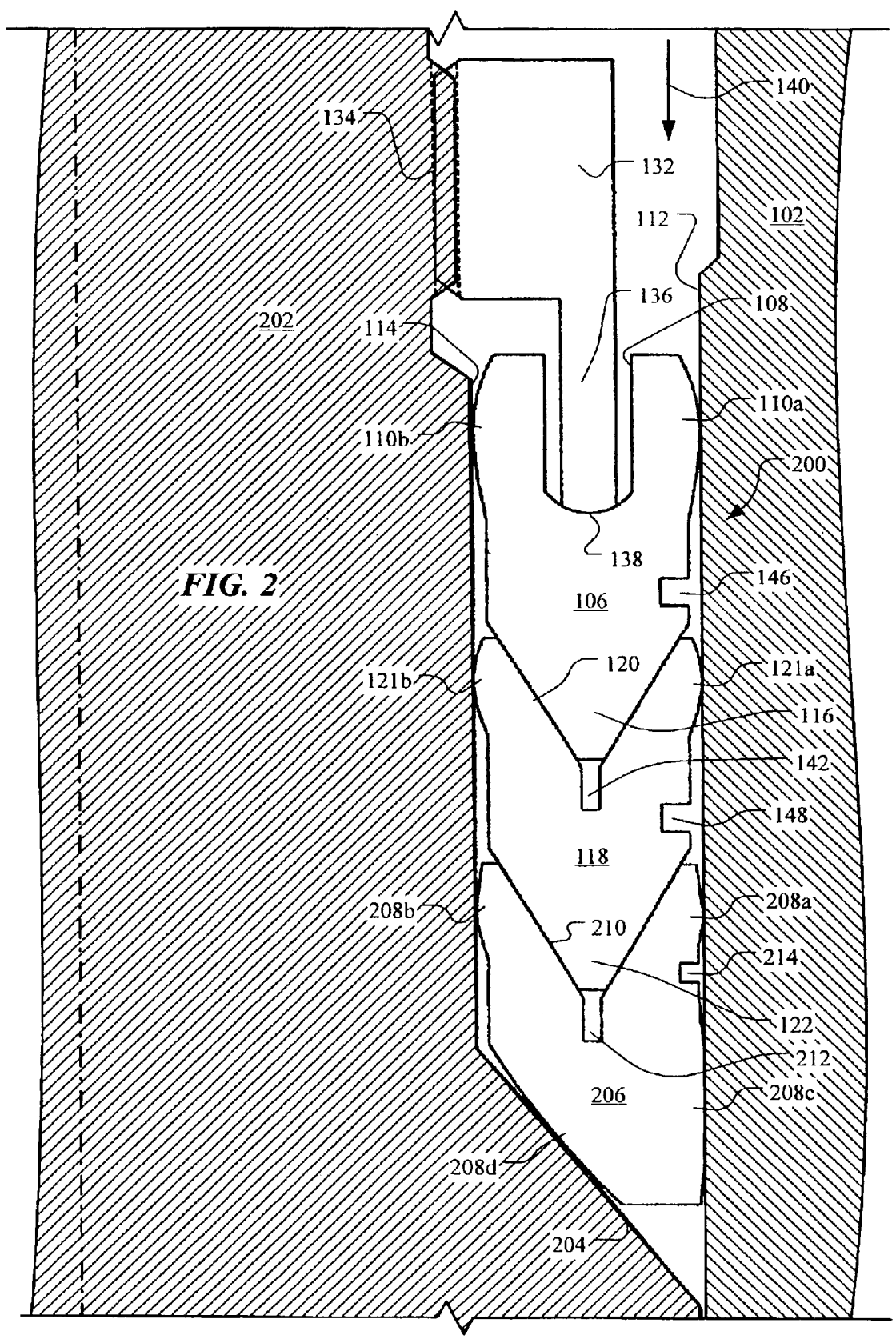
FIG. 2 is cross-sectional side view of a second illustrative embodiment of a seal according to the present invention.

FIG. 2 depicts a second illustrative embodiment of a metallic, annular seal 200 according to the present invention for sealing between the first component 102 and a second component 202. In the illustrated embodiment, the first component 102, the upper element 106, the intermediate element 118, and the retaining member 132 generally correspond to those of the first embodiment (shown in FIG. 1). The shoulder 130 of the second component 104 of the first embodiment (shown in FIG. 1) has been replaced by a bevel 204 defined by the second component 202. The lower element 124 of the first embodiment has been replace by a lower element 206, which comprises a first sealing profile 208a for sealing against the surface 112, a second sealing profile 208b for sealing against the surface 114, a third sealing profile 208c for sealing against the surface 112, and a fourth sealing profile 208d for sealing against the bevel 204.

As in the first embodiment (shown in FIG. 1), the intermediate element 118 is urged downward as a result of the fluid pressure on the upper element 106, thus applying pressure to the lower element 206. The protrusion 122 of the intermediate element 118 presses against a groove 210 of the lower element 206, which urges the sealing profiles 208a, 208c more firmly against the surface 112, urges the sealing profile 208b more firmly against the surface 114, and urges the sealing profile 208d more firmly against the bevel 204, to inhibit a flow of fluid therebetween. In one embodiment, the lower member 206 further defines a slot 212, which decreases the amount of force required from the intermediate element 118 to urge the sealing profiles 208a, 208b against the surfaces 112, 114, respectively. In the illustrated embodiment, the lower element 206 further defines a recess 214 for use in installing and removing the seal 200.

Figure 3:
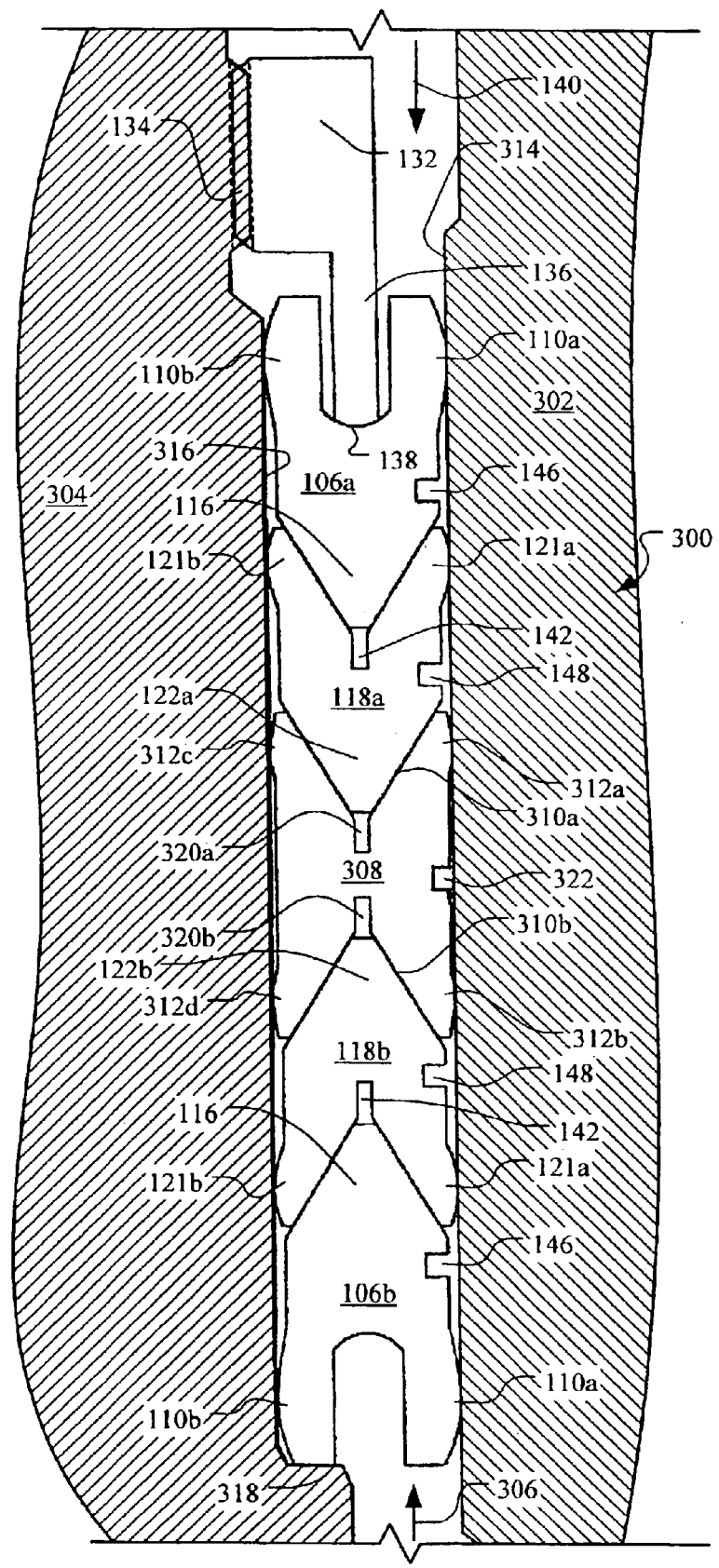
FIG. 3 is cross-sectional side view of a third illustrative embodiment of a seal according to the present invention.

FIG. 3 shows a third illustrative embodiment of a metallic, annular seal 300 according to the present invention for sealing between a first component 302 and a second component 304. While the first two embodiments (shown in FIGS. 1 and 2) are effective in sealing against fluid pressure in a direction generally corresponding to the arrow 140, the embodiment illustrated in FIG. 3 is a bi-directional seal that is effective in sealing against fluid pressure in directions generally corresponding to the arrow 140 and to an arrow 306. In the illustrated embodiment, the seal 300 comprises two each of the upper element 106 (indicated as 106a and 106b in FIG. 3) and two each of the intermediate element 118 (indicated as 118a and 118b in FIG. 3). The retaining element 132, the upper elements 106a, 106b, and the intermediate elements 118a, 118b of the illustrated embodiment generally correspond to those of the first embodiment and the second embodiment (shown in FIGS. 1 and 2, respectively). The present invention is not so limited but, rather, may include upper elements 106a, 106b and intermediate elements 118a, 118b that differ in configuration from one another.

The seal 300 further comprises a center element 308 defining a first groove 310a and a second groove 310b. In the illustrated embodiment, the grooves 310a, 310b are generally V-shaped in cross-section, such that each is capable of mating with one of the protrusions 122a, 122b of the intermediate elements 118a, 118b, respectively. The center element 308 further comprises a first sealing profile 312a and a second sealing profile 312b for sealing against a surface 314 of the first component 302. The center element 308 also includes a third sealing profile 312c and a fourth sealing profile 312d for sealing against a surface 316 of the second component 304.

When the seal 300 is pressurized from above (as indicated by the arrow 140) or below (as indicated by the arrow 306), the upper elements 106a, 106b and the intermediate elements 118a, 118b operate as described above in relation to the first and second embodiments (shown in FIGS. 1 and 2). When pressurized from above, the intermediate element 118a is urged downward as a result of the fluid pressure on the upper element 106a, thus applying pressure to the center element 308. The protrusion 122a of the intermediate element 118a presses against the groove 310a of the center element 308, which urges the sealing profiles 312a, 312c more firmly against the surfaces 314, 316, respectively, to inhibit a flow of fluid therebetween. The downward force is counteracted by the interaction between the upper element 106b and a shoulder 318 of the second component 304.

When pressurized from below, the intermediate element 118b is urged upward as a result of the fluid pressure on the upper element 106b, thus applying pressure to the center element 308. The protrusion 122b of the intermediate element 118b presses against the groove 310b of the center element 308, which urges the sealing profiles 312b, 312d more firmly against the surfaces 314, 316, respectively, to inhibit a flow of fluid therebetween. The downward force is counteracted by the interaction between the upper element 106a and the retaining member 132.

The center member may also define slots 320a, 320b, which decrease the amount of force required from the intermediate elements 118a, 118b to urge the sealing profiles 312a, 312b against the surface 314 and to urge the sealing profiles 312c, 312d against the surface 316. The center element 308 may, in certain embodiments, further define a recess 322 for use in installing and removing the seal 300.

In one embodiment, the retaining member 132 is made from an alloy steel having a yield strength of about 750 MPa, such as, for example, type 4140 steel. The elements 106 (including 106a and 106b), 118 (including 108a and 108b), 124, and 308 may be made from an alloy steel having a yield strength within a range of about 200 MPa to about 500 MPa, such as, for example, type 4130 steel.

While the embodiments disclosed herein are described and shown as having a particular number of elements (e.g., the elements 106, 118, 124, 308), the present invention is not so limited. Rather, the scope of the present invention encompasses any chosen number of elements. For example, an alternative embodiment may comprise the configuration of the first embodiment (shown in FIG. 1) but omitting the intermediate element 118, such that the protrusion 116 of the upper element 106 is received in the groove 126 of the lower element 124.

Further, while the embodiments disclosed herein are described and shown as comprising elements (e.g., the elements 106, 118, 124, 308) having a particular number of sealing profiles (e.g. 110a, 110b, 121a, 121b, 208a, 208b, and 312a–312d), the present invention is no so limited. Rather, the scope of the present invention encompasses elements having any chosen number of sealing profiles. Further, while FIGS. 1–3 depict the first component 102 and the second component 104 as having generally straight sealing surfaces 112, 114, respectively, the present invention is not so limited. Rather, the elements 106, 118, 124, 308 may be used to seal against sealing surfaces having other geometries, such as, for example, those that are stepped.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A seal for sealing between a first component and a second component, comprising:

a first metallic element comprising a plurality of sealing profiles and defining a groove therein;

a second metallic element comprising a plurality of sealing profiles and a protrusion mated with the groove of the first metallic element; and a retaining member engaged with the second metallic element and capable of being engaged with one of the first component and the second component for retaining the first and second metallic elements in a sealing position, wherein some of the plurality of sealing profiles are capable of sealing against the first component and some of the plurality of sealing profiles are capable of sealing against the second component.

2. A seal, according to claim 1, wherein the retaining member further comprises a leg and the second metallic element defines a groove for receiving the leg.

3. A seal, according to claim 1, wherein the retaining member comprises a material selected from the group consisting of a metallic material having a yield strength of about 750 MPa.

4. A seal, according to claim 1, wherein at least one of the first metallic element and the second metallic element comprises a material having a yield strength of about 200 MPa to about 500 MPa.

5. A seal, according to claim 1, wherein the first metallic element further defines a slot extending from the groove thereof.

6. A seal, according to claim 1, wherein at least one of the first metallic element and the second metallic element further defines a recess therein for installing and removing the seal.

7. A seal, according to claim 1, wherein the first metallic element is capable of abutting a shoulder of one of the first component and the second component.

8. A seal, according to claim 1, wherein the first metallic element further comprises a protrusion and the seal further comprises a third metallic element comprising a plurality of sealing profiles and defining a groove therein, wherein:
   the protrusion of the first metallic element is mated with the groove of the third metallic element;
   at least one of the plurality of sealing profiles of the third metallic element is capable of sealing against the first component; and
   at least one of the plurality of sealing profiles of the third metallic element is capable of sealing against the second component.

9. A seal, according to claim 8, wherein the third metallic element comprises a material having a yield strength of about 200 MPa to about 500 MPa.

10. A seal, according to claim 8, wherein the third metallic element further defines a slot extending from the groove thereof.

11. A seal, according to claim 8, wherein the third metallic element further defines a recess therein for installing and removing the seal.

12. A seal for sealing between a first component and a second component, comprising:
   a first metallic element comprising a plurality of sealing profiles and defining a groove therein;
   a second metallic element comprising a plurality of sealing profiles and a protrusion mated with the groove of the first metallic element; and
   a retaining member engaged with the second metallic element and capable of being engaged with one of the first component and the second component for retaining the first and second metallic elements in a position,
   wherein some of the plurality of sealing profiles are capable of sealing against the first component and some of the plurality of sealing profiles are capable of sealing against the second component; and
   wherein the retaining member is capable of being threadedly engaged with one of the first component and the second component.

13. A seal for sealing between a first component and a second component, comprising:
   a first metallic element comprising a plurality of sealing profiles and defining a groove therein;
   a second metallic element comprising a plurality of sealing profiles and a protrusion mated with the groove of the first metallic element; and
   a retaining member engaged with the second metallic element and capable of being engaged with one of the first component and the second component for retaining the first and second metallic elements in a position,
   wherein some of the plurality of sealing profiles are capable of sealing against the first component and some of the plurality of sealing profiles are capable of sealing against the second component; and
   wherein the first metallic element further comprises a sealing profile capable of sealing against a bevel of the second component.

14. A seal for sealing between a first component and a second component, comprising:
   a center metallic element comprising a plurality of sealing profiles and defining a first groove and a second groove therein;
   a first metallic element comprising a plurality of sealing profiles and a protrusion mated with the first groove of the center metallic element;
   a second metallic element comprising a plurality of sealing profiles and a protrusion mated with the second groove of the center metallic element; and
   a retaining member capable of being engaged with one of the first component and the second component for retaining the first metallic element, the center metallic element, and the second metallic element in a position.

15. A seal, according to claim 14, further comprising a third metallic element comprising a plurality of sealing profiles and defining a groove therein, wherein:
   the first metallic element further comprises a protrusion mated with the groove of the third metallic element;
   at least one of the plurality of sealing profiles of the third metallic element is capable of sealing against the first component; and
   at least one of the plurality of sealing profiles of the third metallic element is capable of sealing against the second component.

16. A seal, according to claim 15, further comprising a fourth metallic element comprising a plurality of sealing profiles and defining a groove therein, wherein:
   the second metallic element further comprises a protrusion mated with the groove of the fourth metallic element;
   at least one of the plurality of sealing profiles of the fourth metallic element is capable of sealing against the first component; and
   at least one of the plurality of sealing profiles of the fourth metallic element is capable of sealing against the second component.

17. A method of sealing between a first component and a second component, comprising:
   applying a fluid pressure to a first metallic element;
   urging a plurality of sealing profiles of the first metallic element against the first component and the second component with the fluid pressure;
   urging the first metallic element against a second metallic element with the fluid pressure;
   urging a plurality of sealing profiles of the second metallic element against the first component and the second component; and
   engaging a retaining member with the first metallic element to retain the first metallic element and the second metallic element in a sealing position.

18. A method, according to claim 17, further comprising:
   urging the second metallic element against a third metallic element with the fluid pressure; and urging a plurality of sealing profiles of the third metallic element against the first component and the second component with the fluid pressure.

19. A method of sealing between a first component and a second component comprising:

applying a fluid pressure to a first metallic element;

urging a plurality of sealing profiles of the first metallic element against the first component and the second component with the fluid pressure;

urging the first metallic element against a second metallic element with the fluid pressure;

urging a plurality of sealing profiles of the second metallic element against the first component and the second component; and abutting the third metallic element with a shoulder of one of the first component and the second component.

20. A method of sealing between a first component and a second component, comprising:

applying a fluid pressure to a first metallic element;

urging a plurality of sealing profiles of the first metallic element against the first component and the second component;

urging the first metallic element against a second metallic element; and urging a plurality of sealing profiles of the second metallic element against the first component and the second component, wherein urging the plurality of sealing profiles of the second metallic element further comprises urging at least one of the plurality of sealing profiles against a bevel of the second component.

21. A method, according to claim 20, further comprising:

urging the second metallic element against a third metallic element; and urging a plurality of sealing profiles of the third metallic element against the first component and the second component.

22. A method, according to claim 21, further comprising abutting the third metallic element with a shoulder of one of the first component and the second component.

23. A method, according to claim 20, further comprising retaining the first metallic element and the second metallic element in a position relative to one of the first component and the second component.

24. A method of sealing between a first component and a second component, comprising:

applying a fluid pressure in a first direction to a first metallic element;

urging a plurality of sealing profiles of the first metallic element against the first component and the second component to inhibit a flow of fluid therebetween in the first direction;

urging a first set of a plurality of sealing profiles of a second metallic element against the first component and the second component to inhibit a flow of fluid therebetween in the first direction;

applying a fluid pressure in a second direction that is different from the first direction to a third metallic element;

urging a plurality of sealing profiles of the third metallic element against the first component and the second component to inhibit a flow of fluid therebetween in the second direction; and urging a second set of the plurality of sealing profiles of the second metallic element against the first component and the second component to inhibit the flow of fluid therebetween in the second direction.

25. A method, according to claim 24, wherein:

urging the first set of the plurality of sealing profiles further comprises urging the first metallic element against the second metallic element; and urging the second set of the plurality of sealing profiles further comprises urging the third metallic element against the second metallic element.

26. A method, according to claim 24, wherein urging the first set of the plurality of sealing profiles further comprises:

urging the first metallic element against a fourth metallic element;

urging a plurality of sealing profiles of the fourth metallic element against the first and second component to inhibit the flow of fluid therebetween in the first direction; and urging the fourth metallic element against the second metallic element.

27. A method, according to claim 24, wherein urging the second set of the plurality of sealing profiles further comprises:

urging the third metallic element against a fifth metallic element;

urging a plurality of sealing profiles of the fifth metallic element against the first and second component to inhibit the flow of fluid therebetween in the second direction; and urging the fifth metallic element against the second metallic element.

28. A method, according to claim 27, further comprising abutting the fifth metallic element with a shoulder of one of the first component and the second component.

29. A method, according to claim 24, further comprising retaining the first metallic element, the second metallic element, and the third metallic element in a position relative to one of the first component and the second component.

30. A method of sealing between a first component and a second component, comprising:

applying a fluid pressure to a first metallic element;

urging a plurality of sealing profiles of the first metallic element against the first component and the second component with the fluid pressure;

urging the first metallic element against a second metallic element with the fluid pressure; and urging a plurality of sealing profiles of the second metallic element against the first component and the second component, wherein urging the plurality of sealing profiles of the second metallic element further comprises urging at least one of the plurality of sealing profiles against a bevel of the second component.

* * * * *